United States Patent [19]

Kimura

[11] Patent Number: 4,831,459
[45] Date of Patent: May 16, 1989

[54] GUIDE APPARATUS WITH ROTATING ELEMENTS FOR ENSURING PERPENDICULAR SCANNING MOVEMENTS OF A HAND-OPERATED IMAGE SCANNER

[75] Inventor: Kiyoshi Kimura, Miyagi, Japan
[73] Assignee: Alps Electric Co., Ltd., Japan
[21] Appl. No.: 118,847
[22] Filed: Nov. 9, 1987

[30] Foreign Application Priority Data

Feb. 6, 1987 [JP]  Japan .............................. 62-15655[U]

[51] Int. Cl.⁴ ...................... H04N 1/10; H04N 1/028; H04N 1/04
[52] U.S. Cl. .................................. 358/293; 358/285; 358/294
[58] Field of Search ........................ 358/285, 293, 294

[56] References Cited

U.S. PATENT DOCUMENTS

| | | |
|---|---|---|
| 3,541,248 | 11/1970 | Young. |
| 4,319,283 | 3/1982 | Ozawa et al. .................. 358/293 |
| 4,574,317 | 3/1986 | Scheible ........................ 358/293 |
| 4,611,246 | 9/1986 | Nihei ............................. 358/293 |
| 4,684,998 | 8/1987 | Tanioka et al. ................ 358/293 |
| 4,742,559 | 5/1988 | Fujiwara et al. .............. 358/294 |

FOREIGN PATENT DOCUMENTS

| | | | |
|---|---|---|---|
| 57-7674 | 1/1982 | Japan .................................. | 358/294 |
| 60-103870 | 6/1985 | Japan .................................. | 358/293 |

OTHER PUBLICATIONS

Jagdish C. Tanoon, "Hand Operated Scanner", *Xerox Disclosure Journal*, vol. 9, No. 2, Mar./Apr. 1984, pp. 163–164.

Primary Examiner—James J. Groody
Assistant Examiner—Randall S. Svihla
Attorney, Agent, or Firm—Guy W. Shoup; Paul J. Winters; Brian D. Ogonowsky

[57] ABSTRACT

A guide apparatus for regulating manual movement of an image input device of the type which is manually moved across a fixed manuscript to read an image therefrom. The guide apparatus includes a guide member, such as a rail, for guiding the image input device across the manuscript in a first direction and a rolling means, such as a cylindrical roller, a set of wheels, or a set of caterpillar-type belts, connected to the first direction so that the image input device may be moved in orthogonal directions.

4 Claims, 3 Drawing Sheets

GUIDE APPARATUS WITH ROTATING ELEMENTS FOR ENSURING PERPENDICULAR SCANNING MOVEMENTS OF A HAND-OPERATED IMAGE SCANNER

FIELD OF THE INVENTION

This invention relates to a handy-type image scanner or other information input device, and more particularly to a guide apparatus used in the information input device to manually moved to read information, and more particularly to a guide apparatus for guiding movements of the information input device in proper directions.

BACKGROUND OF THE INVENTION

Image scanners are used as an information input source in order to display information of the information input source such as letters and images as CRT or hard copy. Among others, a handy-type image scanner has been developed and used in these days. The handy-type image scanner is put on an information source such as letters and images to be entered, and manually moved by an operator along the information source to be entered. Entered information is outputted to a computer and processed therein into a desired configuration such as CRT display and hard copy. A more increased demand of handy-type image scanners is expected because they are operated easily, and only a desired part of an information source can be selectively entered.

FIG. 5 is a cross-sectional view of a general arrangement of a handy-type image scanner of this type, and FIG. 6 is a plan view of same while operated. In these drawings, reference numeral 1 denotes a casing of the image scanner. Reference numeral 2 refers to an image sensor, 3 to a lens for focusing information shown in a manuscript 4, 5 to an aperture formed in the bottom plate of the casing 1 to read information, 6 to a roller for detecting the movement distance of the image scanner, 7 to a movement detection sensor such as an encoder connected to the roller 6 to detect the movement amount of the image scanner, 8 to an information primary processing circuit, and 9 to a cord for transmitting primary-processed information signals to a microcomputer or other information processing unit.

In order to read information, using the illustrated device, an operator takes the casing 1 in his hand, and puts it on a desired position of the manuscript 4. Subsequently, he moves the casing 1 in the X-direction in FIG. 6. Responsively, information is entered in the image sensor 2 through the aperture 5 in the bottom plate of the casing 1 and the focusing lens 3. In this case, the image sensor 2 itself also scans the information in the length direction of the aperture 5 (in a right-angled direction with respect to the moving direction of the casing) to input the information. The primary processing circuit 8 is supplied with not only signals from the image sensor 2 but also signals responsive to the movement amount of the image scanner detected by the movement detection sensor 7 via the movement detection roller 6. These signals are primary-processed in the primary processing circuit 8, subsequently outputted to the microcomputer or other information processing unit (not shown) via the cord 9, and finally displayed in the form of CRT display, hard copy or other desired configuration.

While the operator operates the image scanner, he must move the casing 1 accurately linearly along the information source to be entered, i.e. in the X direction in FIG. 6. However, accurately-directed scanning cannot be expected by manual movement. Further, when the information to be entered has a width larger than the dimension of the aperture 5 in the length direction thereof, he must first move the casing 1 linearly, and subsequently shift the casing 1 in a direction across the first direction to repeat another linear movement of the casing 1. In these circumstances, a more accurate image reading operation is expected if the image scanner includes a guide apparatus for guiding the image scanner in two right-angled directions. Such a guide apparatus will be particularly effective in an information input device as disclosed in U.S. application Ser. No. 005,957, filed on Jan. 22, 1987 now abandoned, assigned to the assignee of the present application, which has both functions of image scanner and X-Y input device.

A prior art guide apparatus for this purpose is a T-shaped scale so that longitudinal and transverse movements of the information input device are guided by first guiding the information input device in a first direction along one side of the scale, subsequently moving the scale in a second direction right-angled of the first direction by a desired distance with reference to another side of the scale, and moving again the information input device, following to the scale.

Such a T-shaped scale for guiding an image scanner or other information input device is necessarily a large-scaled guide device which is not readily handled. Particularly, when a manuscript is relatively small, an operator will feel it troublesome to move the scale itself.

OBJECT OF THE INVENTION

It is therefore an object of the invention to provide a guide apparatus which is small-scaled and readily handled to guide movements of an information input device in two orthogonal directions.

SUMMARY OF THE INVENTION

According to the invention, there is provided a guide apparatus for positionally control movements of an information input device which is manually moved with respect to a fixed manuscript to read information on the manuscript, said guide apparatus including a linearly extending guide member for positioning and guiding said information input device when moved in one direction, and a rolling means rotatable in a direction orthogonal of the length direction of the guide member.

According to this arrangement, combination of the linearly extending guide member and a roller or other rolling means contributes to a dimensional decrease of the guide apparatus, and the guide apparatus can move in a predetermined direction in response to rotation of its own rolling means. These factors ensure an excellent operability of the guide apparatus.

BRIEF DESCRIPTION OF THE DRAWINGS

FIGS. 1 and 2 illustrate an embodiment of the invention, in which FIG. 1 is a perspective view of a guide apparatus, and FIG. 2 is a cross-sectional view of the same guide apparatus while used;

DETAILED DESCRIPTION

Figure 1:
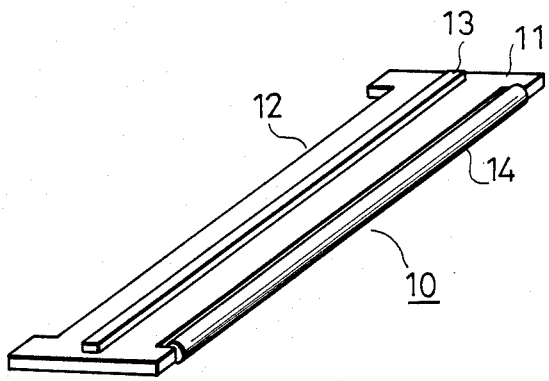

The invention is described below in detail, referring to some preferred embodiments illustrated in the drawings.

Figure 2:
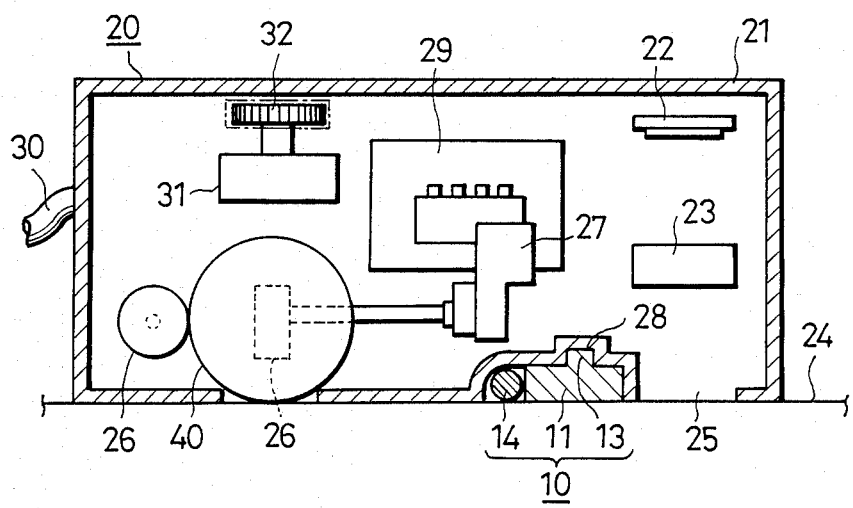

FIGS. 1 and 2 are views for explanation of an embodiment of the invention. FIG. 1 is a perspective view of a guide apparatus, and FIG. 2 is a cross sectional view of the guide apparatus while used.

As shown in FIG. 1, a guide apparatus 10 includes a planar contact member 11 configured to be put on a manuscript surface, a cutout 12 formed by partly cutting off one margin of the contact member 10 in its length direction, a rail-shaped guide member 13 projectingly extending on the contact member in parallel with the cutout 12, and a roller 14 which is a cylindrical member extending in a parallel relationship with the guide member 13 and rotatably supported in contact with the manuscript surface by the contact member 11. The roller 14 is rotatable in a right-angled direction with respect to the length direction of the guide member 13. The guide apparatus 10 can not only guide a linear movement of an information input device along the guide member 13 when the guide member 13 engages a given position of the information input device, but also move itself in a right-angled direction with respect to the said linear direction in response to rotation of the roller 14. Therefore, the device 10 can guide the information input device in two orthogonal directions. The positional relationship between the cutout 12 and the guide member 13 is established so that an edge of an information reading aperture of the information input device is located in the cutout 12 when the information input device is positionally fixed by engagement with the guide member 13.

The guide apparatus 10 is used as explained below in detail, referring to FIG. 2.

An information input device 20, which is operative as both an image scanner and an X-Y input device, includes a casing 21, an image sensor 22, a lens 23 for focusing information shown on a manuscript 24, an aperture 25 formed in the bottom plate of the casing 21 to read information therethrough, two movement detecting rollers 26 rotatable in X and Y directions respectively in response to rotation of a ball member 40, an encoder or other movement detection sensor 27 connected to the respective rollers 26, a cavity groove 28 formed in the bottom plate of the casing 1 and extending in the scanning direction, an information primary processing circuit 29, a cord 30 for outputting primary-processed information signals to a microcomputer or other information processing unit, an encoder 31 for manually changing a data about right and left movements in FIG. 2 among all movements of the casing 1 detected by the movement detection sensor 27, and an input dial 32 affixed to the encoder 31.

In order to enter desired information, using the information input device 20, the guide apparatus 10 is first put on the manuscript 24, locating the cutout 12 in alignment with the position of the information. Subsequently, the information input device 20 is positionally fixed by engagement of the cavity groove 28 with the rail-shaped guide member 13 of the guide apparatus. As a result, a margin of the aperture 25 is located in the cutout 12 of the guide apparatus 10 as described above, and the information input device 20 can be moved accurately along the length direction of the guide member 13. Movement of the information input device 20 is detected by the movement detection sensor 27 via the movement detection roller 26. In response to the movement of the information input device 20, information on the manuscript 24 below the aperture 25 is entered in the image sensor 22 through the lens 23, subsequently primary-processed in the information primary processing circuit 29, and finally outputted to the microcomputer, etc. via the cord 30. After the information is entered by moving the information input device 20 along the length direction of the guide member 13, if the operator wants to move the device 20 in the right-angled direction (in the right and left direction in FIG. 2), he may move the guide apparatus 10 by a desired distance, rotating the roller 14 while maintaining engagement between the cavity groove 28 and the guide member 13. In this case, the movement amount of the information input device 20 responsive to rotation of the roller 14 is detected by the movement detection sensor 27 via the ball member 40 and the movement detection roller 26. Therefore, by first moving the information input device 20 in the right and left direction in FIG. 2 and subsequently moving same in the length direction of the guide member 13, information is entered, deleting information corresponding to that already entered by the preceding scanning among information indicated under the aperture 25.

By using the guide apparatus 10 in this fashion, the information input device 20 is guided accurately along the length direction of the guide member 13. This not only ensures a reliable scanning direction, but also prevents deflection of the guide apparatus 10 during movement because a frictional force is produced between the roller 14 and the manuscript 24. Additionally, since the roller 14 is rotatable in the right-angled direction with respect to the length direction of the guide member 13, the information input device 20 can be moved in the right-angled direction with respect to the scanning direction by rotating the roller 14. As a result, the information input device 20 is moved accurately in the longitudinal and transverse directions by using the guide apparatus 10. Further, the movement amount of the information input device 20 is automatically detected by a movement detection means consisting of its own ball member, movement detection roller and detection sensor. Therefore, when a large-area manuscript is scanned sequentially in some divisions, using the guide apparatus, the resulting entered image maintains the original disposition or configuration in total and never exhibits fragmental pieces of image.

Beside this, since the described embodiment is configured to locate one margin of the aperture 25 in the cutout 12 when the cavity groove 28 of the information input device 20 engages the guide member 13 of the guide apparatus 10, it is possible to first acknowledge the position of information to be read subsequently, by putting the cutout 12 in alignment with the position of the desired information on the manuscript.

Further, since the guide apparatus 10 includes the roller 14 as a rolling means which enables movement of the guide apparatus 10 itself in a predetermined direction, scale reduction and good operability are established as compared to a prior art T-shaped scale.

The guide apparatus 10 may be used as a drafting scale to draw parallel lines, in addition to its use for movement guidance in the information input device. In this case, the inner margin of the cutout 12, for example, is preferably marked with measurement units.

Figure 3:
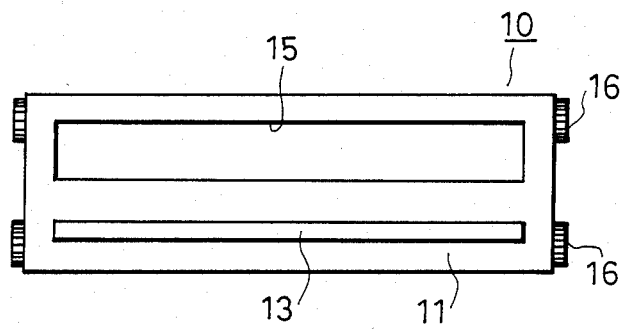
FIG. 3 is a plan view of a guide apparatus according to a further embodiment of the invention.

FIG. 3 is a plan view of a guide apparatus according to a further embodiment of the invention. This embodiment is provided with an elongated slot 5 in lieu of the reading position acknowledging cutout in the preceding embodiment, and includes wheels 16 provided at four corners of the contact member 11 in lieu of the rolling means.

Figure 4:
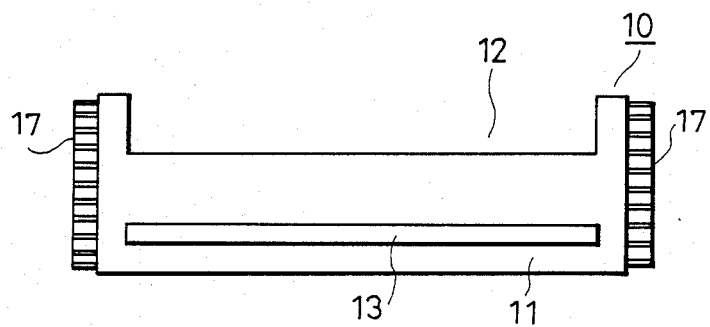
FIG. 4 is a plan view of a guide apparatus according to a still further embodiment of the invention.
Figure 5:
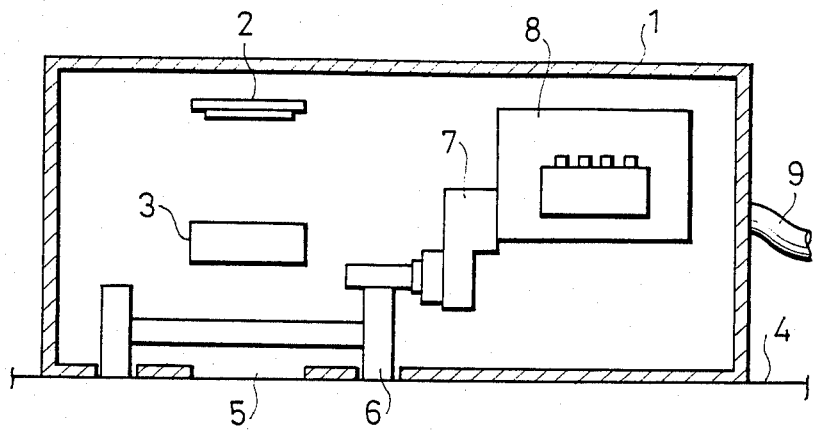
FIG. 5 is a cross sectional view showing a general arrangement of an image scanner.
Figure 6:
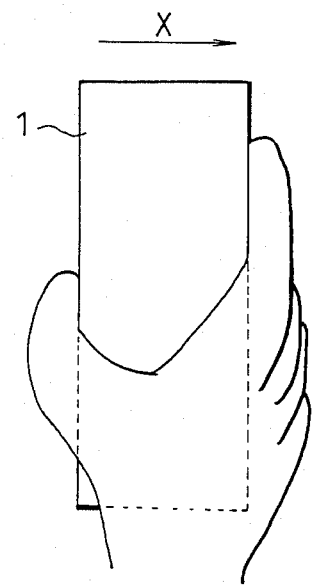
FIG. 6 is a plan view of the same image scanner while operated.

FIG. 4 is a plan view of a guide apparatus according to a still further embodiment of the invention in which caterpillar type belts 17 are provided at opposite ends of the contact member 11 to serve as the rolling means.

In all described embodiments, the linearly extending guide member 13 for guiding the information input device in one direction is shown in the form of a rail. However, the configuration of the guide member may be selected as desired according to the configuration of its counterpart formed in or on the information input device for engagement therewith. For example, a positioning projection may be formed at the bottom plate of the information input device for engagement with a groove-shaped guide member formed in the guide apparatus, or alternatively, the guide apparatus may be provided with a wall for positionally fixing a corner of the information input device.

As described above, by using a combination of the linearly extending guide member and the roller or other rolling means, the invention provides a small-scaled guide apparatus which can guide an information input device in two right-angled directions. Further, since the guide apparatus itself can move in a predetermined direction in response to rotation of its own rolling means, the invention greatly improves the operability of the guide apparatus. Additionally, the guide apparatus, when used as a drafting scale, greatly facilitates a user to draw parallel lines, for example.

What is claimed is:

1. A guide apparatus for regulating manual movement of an image input device, wherein said image input device is of the type which is manually moved relative to a fixed manuscript to read an image therefrom, said guide apparatus comprising a linearly-extending guide member for guiding said image input device in a first direction, and a rolling means connected to said guide member, said rolling means to be placed in contact with said manuscript and being rotatable in a second direction which is right-angled with respect to said first direction, wherein rotating said rolling means transports said guide member in said second direction.

2. An image input device according to claim 1 wherein said rolling means is a cylindrical roller.

3. An image input device according to claim 1 wherein said rolling means is a set of wheels.

4. An image input device according to claim 1 wherein said rolling means is a set of caterpillar-type belts.

* * * * *

UNITED STATES PATENT AND TRADEMARK OFFICE
CERTIFICATE OF CORRECTION

PATENT NO. : 4,831,459

DATED : May 16, 1989

INVENTOR(S) : Kiyoshi Kimura

It is certified that error appears in the above-identified patent and that said Letters Patent is hereby corrected as shown below: Title page:

IN THE ABSTRACT

Line 8, after "connected to", insert --the guide member and rotatable in a direction perpendicular--.

Signed and Sealed this

Ninth Day of January, 1990

Attest:

JEFFREY M. SAMUELS

*Attesting Officer*  *Acting Commissioner of Patents and Trademarks*